United States Patent [19]

Levasseur

[11] 4,125,276
[45] Nov. 14, 1978

[54] FOUR WHEEL DRIVE STABILIZER

[76] Inventor: Joseph E. Levasseur, Rte. 1, Box 238-A, Rockville, Va. 23146

[21] Appl. No.: 855,066

[22] Filed: Nov. 23, 1977

[51] Int. Cl.² ............................................. B60G 13/00
[52] U.S. Cl. .................................. 280/718; 267/54 R
[58] Field of Search ...................... 180/42, 43 R, 44 R, 180/73 R; 280/689, 699, 718; 267/54 R, 54 A, 54 B, 66, 48

[56] References Cited

U.S. PATENT DOCUMENTS

| | | | |
|---|---|---|---|
| 1,327,746 | 1/1920 | Trott | 267/66 X |
| 1,603,348 | 10/1926 | Lord | 267/54 A |
| 2,917,304 | 12/1959 | Nilsson | 267/11 R |
| 3,218,053 | 11/1965 | Shreve | 280/689 X |
| 3,903,831 | 9/1975 | Bartlett et al. | 180/43 R X |

*Primary Examiner*—Kenneth H. Betts
*Attorney, Agent, or Firm*—Mason, Fenwick & Lawrence

[57] ABSTRACT

A stabilizer apparatus to prevent excessive vibration in leaf spring type front wheel assemblies of four-wheel drive vehicles, including a stabilizer shaft, means for mounting the stabilizer shaft on the chassis of the vehicle in a position generally parallel to the pivot axis of the leaf spring, a stabilizer coupling having a first bearing rotatably supported on the stabilizer shaft for rotation about an axis transverse of the chassis, and a second bearing fixed to the first bearing, rotatably supported on a pivot axis of the leaf spring and having an axis of rotation spaced apart and generally parallel to the axis of the first bearing.

7 Claims, 5 Drawing Figures

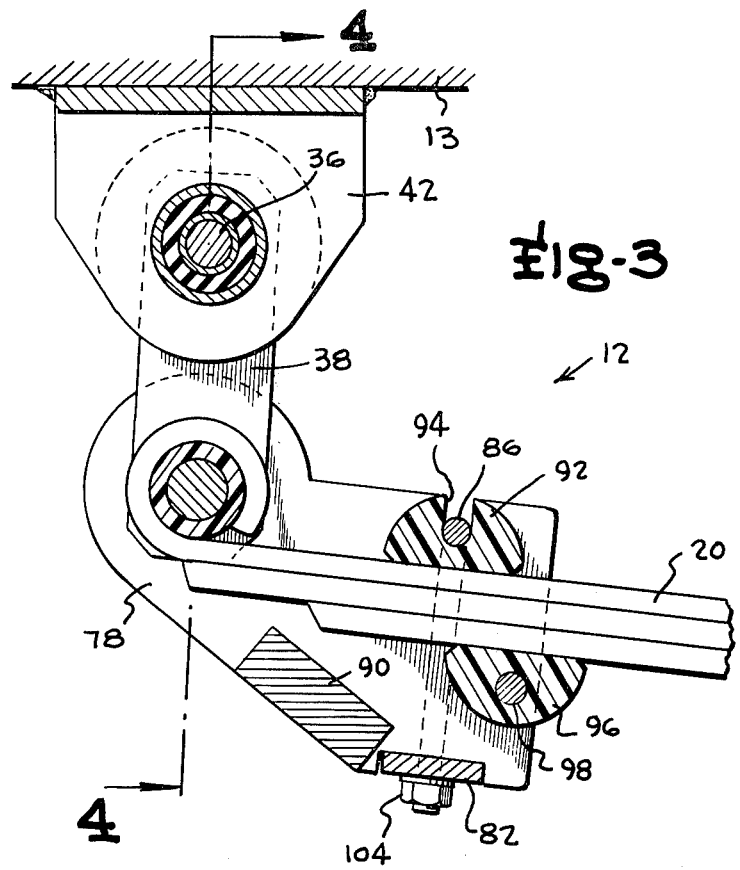
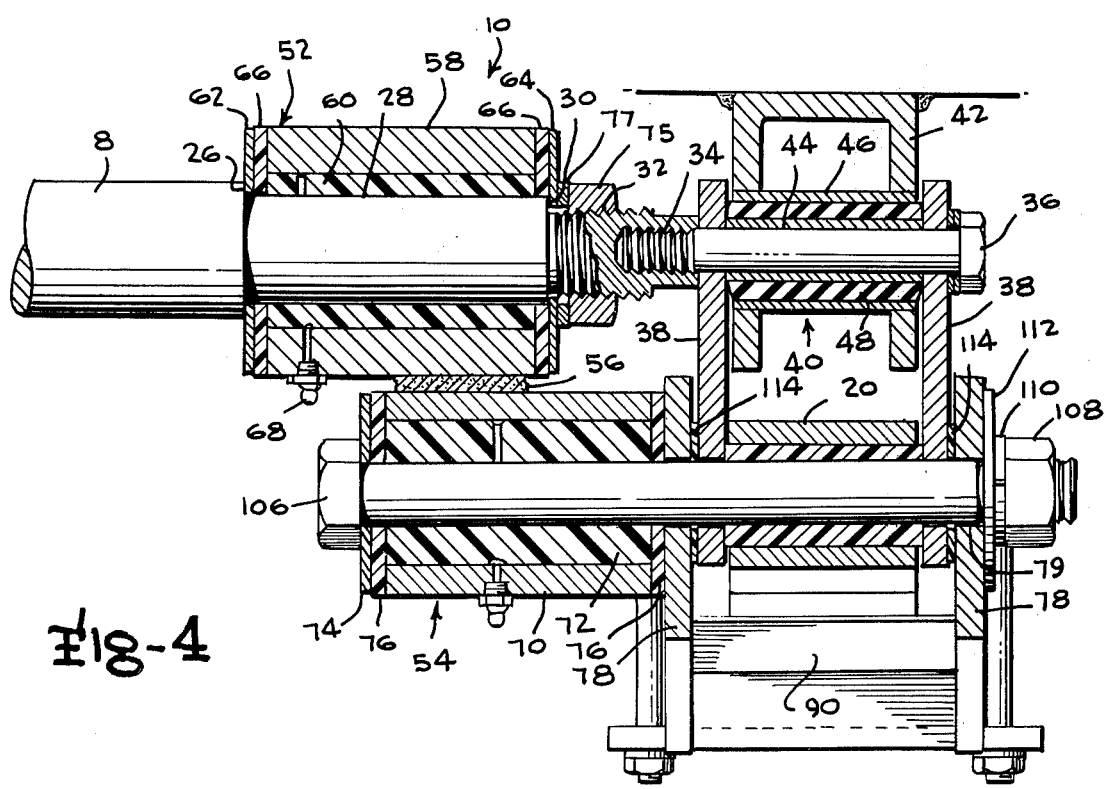

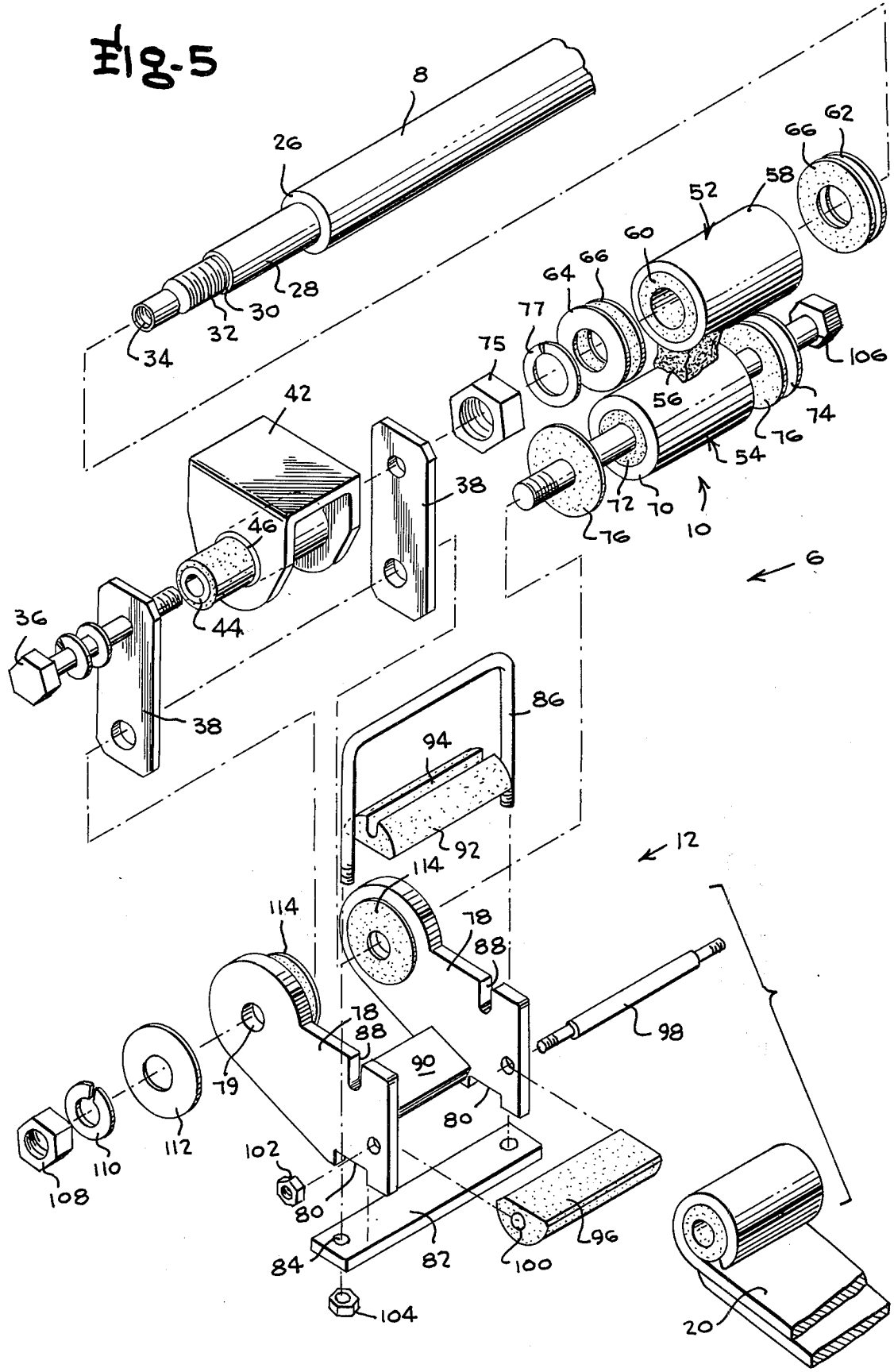

FOUR WHEEL DRIVE STABILIZER

The present invention relates in general to apparatus for eliminating vibrations in vehicles and more specifically to a stabilizer apparatus for preventing vibrations in leaf spring type front wheel assemblies of four-wheel drive vehicles.

After a period of driving and wear, the front wheel assemblies on four-wheel drive vehicles frequently experience a peculiar form of self-induced front end instability which is caused by an unbalanced condition in the four-wheel drive vehicle. Although this condition can occur in conventional automobiles, it occurs with increasing frequency on four-wheel drive vehicles as the vehicles accumulate greater and greater mileage. Four-wheel drive vehicles are particularly prone to this type of front-wheel vibration as one of the inherent features of all four-wheel drive vehicles is that the front axle differential is eccentrically positioned either to the right or left of center because the engine is centrally suspended on the front chassis.

When the angular velocity of the rotating wheel is at the natural frequency or resonance of the suspension system, the wheel and suspension can develop a forced vibration which is limited only by the damping in the system and the range of movement of the vehicle axle. The magnitude of the forced vibration is proportional to the degree of imbalance contained within the suspension system. In vehicles without four-wheel drive, these vibrations usually occur in a vertical plane. In four-wheel drive vehicles, however, a horizontal component of vibration is superimposed on the vibrations in the vertical plane which causes quite severe wheel vibrations simultaneously in both the vertical and horizontal planes.

Previously known stabilizers have included a horizontal shock absorber which has reduced the magnitude of vibrations, however, does not prevent these vibrations. Another previously known stabilizer has consisted of a metal bar bolted at each end to the inside shackles which connect the ends of the leaf springs in the wheel suspension systems. None of the previously known stabilizers have been able to eliminate the tremendously powerful vibrations which can occur in four-wheel vehicles after the suspension systems have begun to wear which typically occurs around 55,000 miles.

Accordingly, it is the primary object of the present invention to provide a novel stabilizer apparatus for four-wheel drive vehicles.

Another object of the present invention is to provide a novel stabilizer apparatus which allows each individual wheel to undergo vertical displacement caused by surface road conditions without conveying the forces of this displacement.

Another object of the present invention is to provide a novel stabilizer system which prevents vibrations before they start in the wheel suspension systems on vehicles.

An additional object of the present invention is to reduce the tendency of a vehicle to rotate about its transverse axis or "roll" by maintaining the shackle units which support the vehicle on the leaf springs of the wheel suspension in a vertical position relative to the vehicle body chassis.

A further object of the present invention is to provide a stabilizer apparatus which permits rotational movement of one shackle assembly independently of the other shackle assembly.

Another object of the present invention is to provide a novel stabilizer apparatus which restricts twisting of the leaf spring in the suspension system by restricting the spring to its normal horizontal position.

A still further object of the present invention is to provide a stabilizer apparatus which eliminates the need to replace front spring bushings to control the degrees of wheel vibration with increasing mileage.

Another object of the present invention is to provide a stabilizer apparatus which greatly reduces the rate of wear on four-wheel drive vehicle tires.

Other objects and advantages of the invention will become more apparent to those persons having ordinary skill in the art to which the present invention pertains from the following description taken in conjunction with the accompanying drawings wherein:

FIG. 3 is a cross-sectional view taken along line 3—3 in FIG. 2;

FIG. 4 is a cross-sectional view taken along line 4—4 in FIG. 3; and

FIG. 5 is a fragmentary exploded perspective view of the stabilizer shaft and stabilizer coupling according to the present invention.

Figure 1:
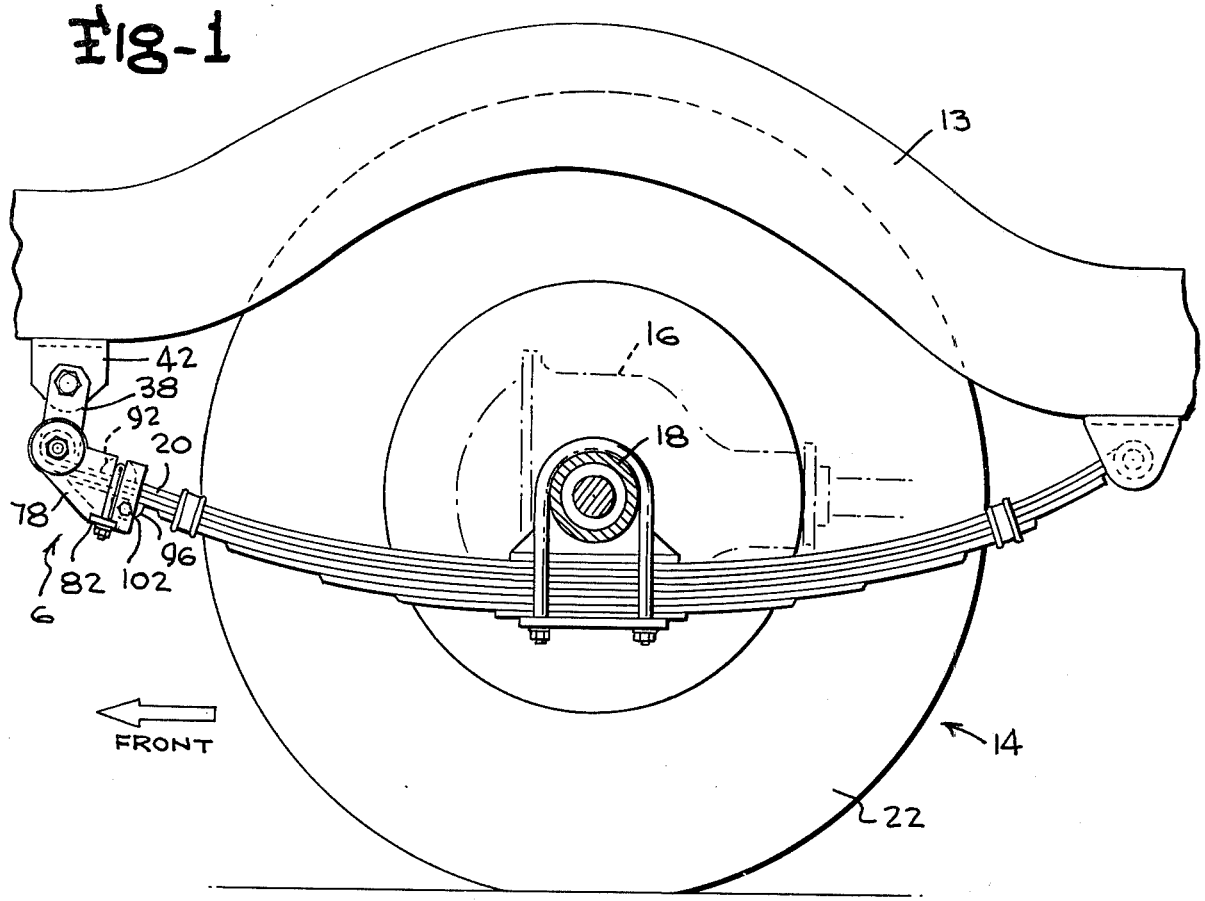
FIG. 1 is a side elevational view of a vehicle suspension system embodying an apparatus according to the present invention.

Referring now to the drawings, there is illustrated a preferred embodiment for practice of the present invention which is generally identified with the reference numeral 6 including a stabilizer shaft 8, stabilizer coupling 10 and immobilizer assembly 12 mounted on a vehicle frame 13 and wheel suspension unit 14 including a drive differential 16, drive axles 18, leaf springs 20 and wheels 22. The wheel suspension system and chassis are of conventional configuration thereby permitting the present invention to be adapted to use the present invention without requiring any modification in the suspension system.

Figure 2:
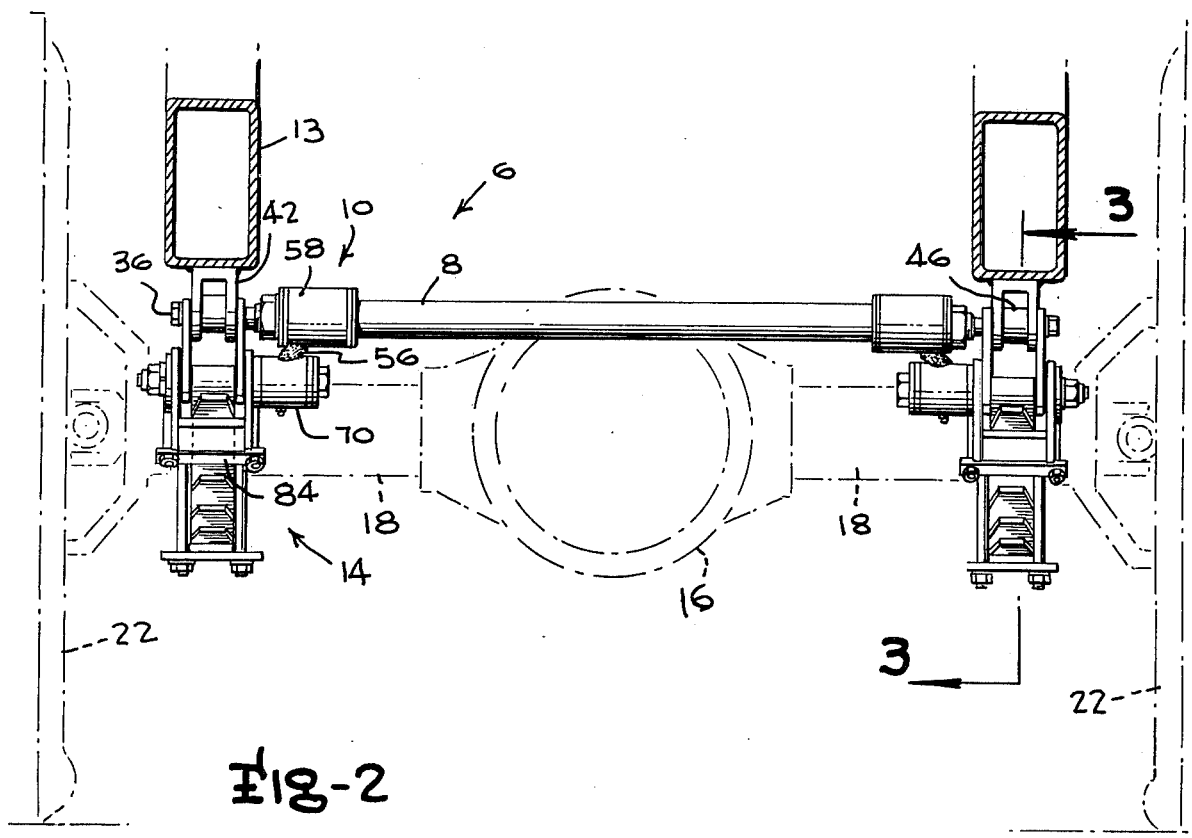
FIG. 2 is a rear elevational view of the apparatus shown in FIG. 1.

Drawing attention particularly to FIGS. 2 and 5, the stabilizer shaft 8 is formed from a steel rod having at its ends a fixed shoulder 26 formed by a reduced diameter segment 28, a second shoulder 30 at the opposite end of the reduced diameter segment 28 and formed by a threaded reduced diameter segment 32. The ends of the stabilizer shaft 8 have threaded bores 34. The stabilizer shaft 8 is mounted to the vehicle chassis by a shaft mounting bolt 36 which extends through the spring shackles 38 and a vibration damper sleeve 40 supported by a bracket 42 welded to a lower surface of the frame 12 as best shown in FIGS. 3 and 4. The vibration damper sleeve 40 includes a steel inner sleeve 44 and a steel outer sleeve 46 with an elastomeric resilient sleeve 48 filling the space between the inner and outer sleeves. The sleeve 40 is conventional for reducing wear in the shackle assemblies.

Mounted on the opposite ends of the stabilizer shaft 8 are the stabilizer couplings 10 as best shown in FIGS. 4 and 5. The stabilizer couplings 10 includes an upper rotary sleeve assembly 52 rigidly attached to a lower rotary sleeve assembly 54 by a web 56 formed by welding or the like as shown in the various figures. The upper rotary sleeve assembly includes a steel tubular outer shell 58, a bearing sleeve 60 of nylon or the like for low friction and having an inner diameter sized to fit on the reduced diameter segment 28 of the stablizer shaft to provide a low-friction, close-fitting bearing surface between the stabilizer shaft 8 and the upper rotary sleeve assembly 52. An inner steel washer 62 seats against shoulder 26 and an outer steel washer 64 seats against shoulder 30 to retain resilient washers 66 between the outer shell 58 and the inner and outer washers. A grease fitting 68 with appropriate passageways through the assembly may be included to permit periodic lubrication of the upper sleeve assembly.

The lower sleeve assembly 54 is of similar construction and includes a tubular outer shell 70, a bearing sleeve 72, an outer washer 74 and resilient washers 76. The upper sleeve assembly is retained on the stabilizer shaft 8 by a nut 75 and split washer 77.

The immobilizer assembly 12 functions to prevent twisting of the leaf spring 20 and eliminate twisting vibration during operation of the wheel suspension. This assembly includes stabilizer plates 78 having holes 79 at one end thereof and having notches 80 on the lower edge of the opposite ends to receive a clamp plate 82 having holes 84 at its opposite ends to receive a U-shaped bolt 86 which fits into slots 88 on the upper edge of the stabilizer plate. The slots 88 are positioned over the notches 80 and the threaded ends of the U-shaped bolt pass through the holes 84 in plate 82. The stabilizer plates 78 are rigidly mounted together by a cross bar 90 which is welded at its ends to the stabilizer plates as shown in FIG. 5. The leaf spring 20 is immobilized by an upper locking plate 92 which fits between the stabilizer plates 78 and has a slot along the upper surface thereof to engage the center portion of the U-shaped bolt 86. A lower immobilizer plate 96 fits between the stabilizer plate 78 and is held in position by a spacer rod 98 which is threaded at its opposite ends and passes through holes near the notches 80 in the stabilizer plates and through a bore 100 in the lower immobilizer plate 96 to lock the lower immobilizer plate 96 between the stabilizer plates when nuts 102 threadingly engage the spacer rod 98. The upper and lower immobilizer plates seat against spring 20 as best shown in FIG. 3 when the U-shaped bolt is locked in position by nuts 104.

As best shown in FIG. 4, the lower sleeve assembly 54 is fastened to the immobilizer assembly 12 and the shackles 38 by a lower shackle bolt 106 which passes through the lower stabilizer coupling, the stabilizer plates 78, and the shackles 38. The lower shackle bolt 106 is locked in position by shackle nut 108, lock washer 110, and bearing washer 112. Spacer washer 114 separates the shackles 38 from the stabilizer plates 78 as best shown in FIG. 4.

The stabilizer assembly according to the present invention is easily installed on the front wheel suspension assemblies of conventional four-wheel vehicles by sliding the upper stabilizer couplings 52 on opposite ends of the stabilizer shaft 8 and locking them in position with nuts 75 as shown in FIG. 4. The upper shackle bolts 36 are then threadingly engaged with threaded bores 34 to lock the assemblies in position on the chassis frame 13. The conventional lower shackle bolt is removed with the longer bolts 106 required by the present invention being inserted through the lower stabilizer coupling 54 and through the immobilizer assembly bolt holes 79 and locked in position by the lower shackle bolt nuts 108 as shown in FIG. 4. The stabilizer plates 78 can then be swung upwardly to the position shown in FIG. 3 with the lower immobilizer plates 96 locked in position by spacer rods 98 and the upper immobilizer plates 92 placed in position on spring 20. In this position, the U-shaped bolt 86 is lowered into slots 88 and groove 94 on the backside of the upper immobilizer plate 92 with the lower ends passing through the holes 84 in plate 82 to be threadingly engaged by nuts 104 to lock the immobilizer assembly onto the spring 20.

As can easily be seen, the present invention permits rotation of the shackles 38 about the upper shackle bolt 36 in an unrestricted manner since the stabilizer couplings are free to rotate about the stabilizer shaft 8 and the lower shackle bolt 106 while preventing any movement of the shackles and leaf springs from side to side as viewed in FIG. 4 thereby eliminating the movement which has previously resulted in severe vibration of the wheel assemblies. The immobilizer assembly 8 permits the leaf spring to rotate about the lower shackle bolt 106 while simultaneously preventing any twisting of the leaf spring 20 to eliminate an additional source of vibration.

From the foregoing detailed description, it will be evident that there are a number of changes, adaptations and modifications of the present invention which come within the province of those skilled in the art such as forming stabilizer shaft 8 as a stub shaft with the end opposite the coupling assembly being fixed to the frame of the vehicle thereby permitting application of the present invention to rear wheels or any suspension assembly utilizing leaf springs. It is intended that all such variations not departing from the spirit of the invention be considered as within the scope thereof and as limited solely by the appended claims.

I claim:

1. A stabilizer apparatus particularly adapted to prevent excessive vibration in leaf spring type front wheel assemblies of four-wheel drive vehicles, said stabilizer apparatus comprising a stabilizer shaft mountable adjacent the leaf springs, a coupling shaft and a stabilizer coupling at each end of said stabilizer shaft, each said couplings having a first bearing mounted on said stabilizer shaft for rotation about the axis of said stabilizer shaft and a second bearing fixed to said first bearing and having an axis spaced apart and generally parallel to the axis of the first bearing, said second bearing mounted on said coupling shafts for rotation about the axes of said coupling shafts.

2. The stabilizer apparatus of claim 1 additionally including two stabilizer plates adjacent each of the second bearings, third bearings between said stabilizer plates and said coupling shaft for permitting rotation of said stabilizer plates about said coupling shaft, a lower immobilizer member fixed between said stabilizer plates, an upper immobilizer member spaced apart from said lower immobilizer member and means for clamping said upper immobilizer member in a desired position between said stabilizer plates thereby providing a means for clamping a leaf spring therebetween.

3. In a vehicle wheel assembly of the type having a leaf spring pivoted on shackles, an improvement comprising a stabilizer shaft, means for mounting the stabilizer shaft on the chassis of the vehicle with the axis of the shaft generally parallel to the pivot axis of the leaf spring, and a stabilizer coupling having a first bearing rotatably supported on the stabilizer shaft for rotation about the axis of the shaft, a second bearing fixed to the first bearing and having an axis spaced apart and generally parallel to the axis of the first bearing, and means for rotatably supporting said second bearing with the axis of said second bearing coaxial with said pivot axis of said leaf spring.

4. The improvement of claim 3 additionally including means for limiting movement of said leaf spring adjacent said pivot axis relative to said second bearing axis to movement about said pivot axis of said leaf spring thereby preventing twisting of said leaf spring to eliminate a source of destructive vibration.

5. The stabilizer apparatus of claim 4 wherein the means for preventing movement of said leaf spring includes two stabilizer plates, third bearings between said stabilizer plates and said stabilizer coupling for permitting rotation of said stabilizer plates about said axis of said second bearing, a lower immobilizer member fixed between said stabilizer plates, an upper immobilizer member spaced apart from said lower immobilizer member and means for clamping said upper immobilizer member in a desired position between said stabilizer plates thereby providing a means for clamping a leaf spring therebetween.

6. In vehicle wheel assemblies of the type having a leaf spring pivoted on shackles, an improvement comprising a stabilizer shaft, means for mounting the stabilizer shaft on the chassis of the vehicle with the axis of the shaft generally parallel to the pivot axis of the leaf springs, and two stabilizer couplings having first bearings rotatably supported on opposite ends of the stabilizer shaft for rotation about the axis of the shaft, second bearings fixed to said first bearings and having axes spaced apart and generally parallel to the axes of the first bearings, and means for rotatably supporting said second bearings with the axes of said second bearings coaxial with said pivot axes of two of said leaf springs thereby preventing excessive vibration of the wheel assemblies.

7. The improvement of claim 6 additionally including means for limiting movement of one of said leaf springs adjacent said pivot axis, relative to said second bearing axis, to movement about said pivot axis of said leaf spring thereby preventing twisting of said leaf spring to eliminate a source of destructive vibration.

* * * * *